(12) United States Patent
Kim et al.

(10) Patent No.: US 8,966,977 B2
(45) Date of Patent: Mar. 3, 2015

(54) APPARATUS FOR DRIVING GYROSCOPE SENSOR AND METHOD THEREOF

(75) Inventors: Chang Hyun Kim, Gyunggi-do (KR); Byeung Leul Lee, Gyunggi-do (KR)

(73) Assignees: Samsung Electro-Mechanics Co., Ltd., Gyunggi-Do (KR); Korea University of Technology and Education, Industry-University Cooperation Foundation (KR)

( * ) Notice: Subject to any disclaimer, the term of this patent is extended or adjusted under 35 U.S.C. 154(b) by 240 days.

(21) Appl. No.: 13/438,504

(22) Filed: Apr. 3, 2012

(65) Prior Publication Data

US 2013/0055811 A1 Mar. 7, 2013

(30) Foreign Application Priority Data

Sep. 2, 2011 (KR) ........................ 10 2011 0089090

(51) Int. Cl.
*G01C 19/56* (2012.01)
*G01C 19/5776* (2012.01)

(52) U.S. Cl.
CPC ................... *G01C 19/5776* (2013.01)
USPC ....................................... 73/504.12

(58) Field of Classification Search
USPC ...................................... 73/504.12
See application file for complete search history.

(56) References Cited

U.S. PATENT DOCUMENTS

| 4,703,246 A | * | 10/1987 | Sakamoto et al. | ............ 318/809 |
| 8,375,790 B2 | * | 2/2013 | Sato et al. | ................... 73/504.12 |
| 2005/0274181 A1 | * | 12/2005 | Kutsuna et al. | ............ 73/504.12 |
| 2012/0285244 A1 | * | 11/2012 | Kim | ........................ 73/504.12 |

FOREIGN PATENT DOCUMENTS

| JP | 11-351880 | 12/1999 |
| JP | 3159045 | 4/2010 |
| JP | 2010-197062 | 9/2010 |
| JP | 2011-038955 | 2/2011 |
| JP | 2011-099818 | 5/2011 |
| KR | 100657424 | 12/2006 |

OTHER PUBLICATIONS

Office action dated Aug. 6, 2013 from corresponding Japanese Patent Application No. 2012-088233 and its English summary provided by the client.

* cited by examiner

*Primary Examiner* — Hezron E Williams
*Assistant Examiner* — Mark A Shabman
(74) *Attorney, Agent, or Firm* — Ladas & Parry, LLP

(57) ABSTRACT

Disclosed herein are an apparatus and a method for driving a gyroscope sensor. The apparatus for driving a gyroscope sensor includes: a detection module; a phase conversion module; an inversion module; a switch module selecting and outputting any one of the driving voltage and the inversion voltage for each axis; a driving module supplying driving voltage of a driving axis at the time of the driving and supplying inversion voltage at the time of stopping the driving; and a control unit passing the driving voltage of the driving axis by controlling the switch module according to a switching control signal at the time of the driving and passing the inversion voltage of each axis by controlling the switch module according to the switching control signal at the time of stopping the driving.

10 Claims, 4 Drawing Sheets

APPARATUS FOR DRIVING GYROSCOPE SENSOR AND METHOD THEREOF

CROSS REFERENCE TO RELATED APPLICATION

This application claims the benefit of Korean Patent Application No. 10-2011-0089090, filed on Sep. 2, 2011, entitled "Apparatus For Driving Gyroscope Sensor And Method Thereof", which is hereby incorporated by reference in its entirety into this application.

BACKGROUND OF THE INVENTION

1. Technical Field

The present invention relates to an apparatus for driving a gyroscope sensor and a method thereof.

2. Description of the Related Art

Generally, a gyroscope sensor is a sensor measuring angular velocity using Coriolis force Fc of a vibrating object.

In this case, the Coriolis force at the gyroscope sensor is represented by the following Equation 1.

$$Fc = 2mV\Omega \quad \text{[Equation 1]}$$

Where Fc: Coriolis force, m: mass, V: velocity, $\Omega$: angular velocity.

Referring to the above Equation 1, the gyroscope sensor is vibrated by a driving signal to generate velocity V, thereby measuring the Coriolis force Fc. In this case, when the velocity V defined by the driving and the sensed Coriolis force Fc are known, the angular velocity $\Omega$ of the gyroscope sensor may be calculated since the mass m is known.

That is, the angular velocity $\Omega$ is represented by 'Fc/2 mV' and therefore, the angular velocity $\Omega$ may be obtained by measuring the Coriolis force Fc while driving the object m at a predetermined velocity V.

In particular, the Coriolis force Fc, the velocity V, and the angular velocity $\Omega$ are a vertical vector to each other. For example, in order to obtain Z-directional angular velocity $\Omega z$, velocity Vx may be given in an X direction and Coriolis force Fc_y in a Y direction may be measured. In addition, in order to measure the angular velocities $\Omega x$ and $\Omega y$ in X and Y directions, the velocity Vz is given in a Z direction and Coriolis forces Fc_y and Fc_x in the X and Y directions may be measured.

That is, in order to measure the angular velocity in several directions, the vibration direction of the vibrating object needs to be changed and a sampling rate needs to be increased so as to increase a measurement frequency bandwidth of the angular velocity.

For example, in order to obtain the measurement frequency bandwidth of 0 to 100 Hz, the sampling needs to be performed 200 times for at least 1 sec.

Generally, the gyroscope sensor vibrates the object having a high Q factor as described in Japanese Patent Laid-Open No. 2010-197062 or Korean Patent 10-0657424 and is thus driven in the Z axis to measure angular velocities in the X and Y axes and then, is driven in the X-axis direction by switching a moving direction of the object so as to measure the angular velocity in the Z axis. To this end, a driving stop time for switching a direction is needed.

However, the apparatus for driving a gyroscope sensor according to the prior art does not include a special technical device for stopping during the driving and therefore, consumes much time from the driving to the stopping, thereby increasing a settling time. Therefore, the apparatus for driving a gyroscope sensor according to the prior art is inappropriate to apply for a multi-axis gyroscope sensor.

SUMMARY OF THE INVENTION

The present invention has been made in an effort to provide an apparatus for driving a gyroscope sensor and a method thereof capable of rapidly stopping a driving of the gyroscope sensor, rapidly performing an axis change in a multi-axis gyroscope sensor, and performing multi-axis sensing at a high speed, by detecting a motion of a sensor in a gyroscope sensor and performing reverse driving to the motion of the detected sensor.

According to a preferred embodiment of the present invention, there is provided an apparatus for driving a gyroscope sensor, including: a detection module detecting and outputting voltage corresponding to angular velocity of each axis of a gyroscope sensor; a phase conversion module generating driving voltage corresponding to each axis by shifting a phase of voltage detected in the detection module and output therefrom; an inversion module inverting driving voltage output from the phase conversion module and generating inversion voltage corresponding to each axis; a switch module selecting any one of the driving voltage output from the phase conversion module and the inversion voltage output from the inversion module according to a switching control signal for each axis; a driving module supplying driving voltage of a driving axis passing through the switch module to driving electrodes of the gyroscope sensor at the time of the driving and supplying the inversion voltage of each axis to the driving electrodes of each axis of the gyroscope sensor at the time of stopping the driving; and a control unit passing the driving voltage of the driving axis by controlling the switch module using a switching control signal at the time of driving and passing the inversion voltage of each axis by controlling the switch module according to the switching control signal at the time of stopping the driving.

The detection module may include: a first detection unit detecting voltage corresponding to angular velocity of a first axis of the gyroscope sensor through a first-axis detection electrode; a second detection unit detecting voltage corresponding to angular velocity of a second axis of the gyroscope sensor through a second-axis detection electrode; and a third detection unit detecting voltage corresponding to angular velocity of a third axis of the gyroscope sensor through the first-axis detection electrode and the second-axis detection electrode.

The first detection unit may include: a first detection amplifier receiving, amplifying, and outputting the output voltage of the first-axis positive detection electrode of the gyroscope sensor; a second detection amplifier receiving, amplifying, and outputting the output voltage of the first-axis negative detection electrode of the gyroscope sensor; and a first detection subtractor subtracting the output voltage of the second detection amplifier from the output voltage of the first detection amplifier to detect and output the voltage corresponding to the angular velocity of the first axis of the gyroscope sensor.

The second detection unit may include: a third detection amplifier receiving, amplifying, and outputting the output voltage of the second-axis positive detection electrode of the gyroscope sensor; a fourth detection amplifier receiving, amplifying, and outputting the output voltage of the second-axis negative detection electrode of the gyroscope sensor; and a second detection subtractor subtracting the output voltage of the fourth detection amplifier from the output voltage of the third detection amplifier to detect and output the voltage corresponding to the angular velocity of the second axis of the gyroscope sensor.

The third detection unit may include a first detection adder adding the output voltage of the first-axis positive detection electrode of the gyroscope sensor, the output voltage of the first-axis negative detection electrode, the output voltage of the second-axis positive detection electrode, and the output voltage of the second-axis negative detection electrode to detect and output voltage corresponding to angular velocity of the third axis of the gyroscope sensor.

The phase conversion module may include: a first phase conversion unit generating first-axis driving voltage by shifting the phase of voltage output from the first detection unit; a second phase conversion unit generating second-axis driving voltage by shifting the phase of voltage output from the second detection unit; and a third phase conversion unit generating third-axis driving voltage by shifting the phase of voltage output from the third detection unit.

The inversion module may include: a first inversion unit inverting the driving voltage output from the first phase conversion unit to generate inversion voltage corresponding to the first axis; a second inversion unit inverting the driving voltage output from the second phase conversion unit to generate inversion voltage corresponding to the second axis; and a third inversion unit invert the driving voltage output from the third phase conversion unit to generate inversion voltage corresponding to the third axis.

The switch module may include: a first switch unit selecting and passing any one of the driving voltage output from the first phase conversion unit and the inversion voltage output from the first inversion unit according to the switching control signal; a second switch unit selecting and passing any one of the driving voltage output from the second phase conversion unit and the inversion voltage output from the second inversion unit according to the switching control signal; and a third switch unit selecting and passing any one of the driving voltage output from the third phase conversion unit and the inversion voltage output from the third inversion unit according to the switching control signal.

The driving module may include: a first driving unit supplying the driving voltage of the driving axis in the driving voltage passing through the first and third switch units to the corresponding driving electrode of the gyroscope sensor at the time of the driving and supplying the inversion voltage passing through the first and third switch unit to the corresponding driving electrode of the gyroscope sensor at the time of stopping the driving; and a second driving unit supplying the driving voltage of the driving axis in the driving voltage passing through the second and third switch units to the corresponding driving electrode of the gyroscope sensor at the time of the driving and supplying the inversion voltage passing through the second and third switch unit to the corresponding driving electrode of the gyroscope sensor at the time of stopping the driving.

The first driving unit may include: a first driving adder passing or adding and outputting the first-axis driving voltage or the first-axis inversion voltage passing through the first-axis switch unit and the third-axis driving voltage or the third-axis inversion voltage passing through the third-axis switch unit, respectively; a first driving subtractor passing the third-axis driving voltage or the third-axis inversion voltage signal passing through the third-axis switch unit, inverting and outputting the first-axis driving voltage or the first-axis inversion voltage passing through the first-axis switch unit, or outputting a signal subtracting the first-axis driving voltage or the first-axis inversion voltage passing through the first-axis switch unit from the third-axis driving voltage or the third-axis inversion voltage passing through the third-axis switch unit; and a first driving amplifier amplifying the voltage output from the first driving adder and applying the amplified voltage to the positive driving electrode disposed on the first axis of the gyroscope sensor and amplifying the voltage output from the first driving subtractor and applying the amplified voltage to the negative driving electrode disposed on the first axis of the gyroscope sensor.

The second driving unit may include: a second driving adder passing or adding and outputting the second-axis driving voltage or the second-axis inversion voltage passing through the second-axis switch unit and the third-axis driving voltage or the third-axis inversion voltage passing through the third-axis switch unit, respectively; a second driving subtractor passing the second-axis driving voltage or the second-axis inversion voltage signal passing through the third-axis switch unit, inverting and outputting the third-axis driving voltage or the third-axis inversion voltage passing through the second-axis switch unit, or outputting a signal subtracting the second-axis driving voltage or the second-axis inversion voltage passing through the second-axis switch unit from the third-axis driving voltage or the third-axis inversion voltage passing through the third-axis switch unit; and a second driving amplifier amplifying the voltage output from the second driving adder and applying the amplified voltage to the positive driving electrode disposed on the second axis of the gyroscope sensor and amplifying the voltage output from the second driving subtractor and applying the amplified voltage to the negative driving electrode disposed on the second axis of the gyroscope sensor.

According to another preferred embodiment of the present invention, there is provided a method for driving a gyroscope sensor, including: (A) detecting voltage corresponding to angular velocity of each axis of a gyroscope sensor through a detection electrode of a corresponding axis by a detection module; (B) generating driving voltage corresponding to each axis by shifting a phase of voltage of each axis detected in the detection module by a phase conversion module; (C) inverting driving voltage corresponding to each axis of the phase conversion module and generating inversion voltage corresponding to each axis by an inversion module; (D) providing the driving voltage corresponding to a driving axis in the driving voltage output from the phase conversion module at the time of the driving to the gyroscope sensor by controlling a switch module and a driving module by a control unit; and (E) supplying inversion voltage of each axis output from the inversion module to driving electrodes of the gyroscope sensor at the time of stopping the driving by controlling the switch module and the driving module by a control unit.

(A) the detecting of the voltage may include: (A-1) detecting, by a first detection unit configuring the detection module, voltage corresponding to angular velocity of a first axis of the gyroscope sensor through a first-axis detection electrode; (A-2) detecting, by a second detection unit configuring the detection module, voltage corresponding to angular velocity of a second axis of the gyroscope sensor through a second-axis detection electrode; and (A-3) detecting, by a third detection unit configuring the detection module, voltage corresponding to angular velocity of a third axis of the gyroscope sensor through a first-axis detection electrode and a second-axis detection electrode.

(B) the generating of the driving voltage may include: (B-1) shifting a phase of voltage output from the first detection unit by a first phase conversion unit configuring the phase conversion module to generate first-axis driving voltage; (B-2) shifting a phase of voltage output from the second detection unit by a second phase conversion unit configuring the phase conversion module to generate second-axis driving voltage by; and (B-3) shifting a phase of voltage output from the third detection unit by a third phase conversion unit configuring the phase conversion module to generate third-axis driving voltage.

(C) the inverting of driving voltage may include: (C-1) inverting the driving voltage output from the first phase conversion unit by a first inversion unit configuring the inversion module to generate inversion voltage corresponding to the first axis; (C-2) inverting the driving voltage output from the second phase conversion unit by a second inversion unit configuring the inversion module to generate inversion voltage corresponding to the second axis; and (C-3) inverting the driving voltage output from the third phase conversion unit by a third inversion unit configuring the inversion module to generate inversion voltage corresponding to the third axis.

(D) the providing of the driving voltage may include: (D-1) outputting, by the control unit, a switching control signal to the switch module so as to pass through the driving voltage of the driving axis at the time of the driving; (D-2) passing, by the switch module, the driving voltage of the driving axis in the driving voltage output from the phase conversion module according to the switching control signal; and (D-3) supplying, by the driving module, the driving voltage of the driving axis passing through the switch module to the driving electrode of the gyroscope sensor.

(E) the supplying of the inversion voltage may include: (E-1) outputting, by the control unit, the switching control signal to the switch module so as to pass through the inversion voltage at the time of stopping the driving; (E-2) passing, by the switch module, the inversion voltage of each axis output from the inversion module; and (E-3) supplying, by the driving module, the inversion voltage of each axis passing through the switch module to the driving electrode of the gyroscope sensor.

DESCRIPTION OF THE PREFERRED EMBODIMENTS

Figure 1:
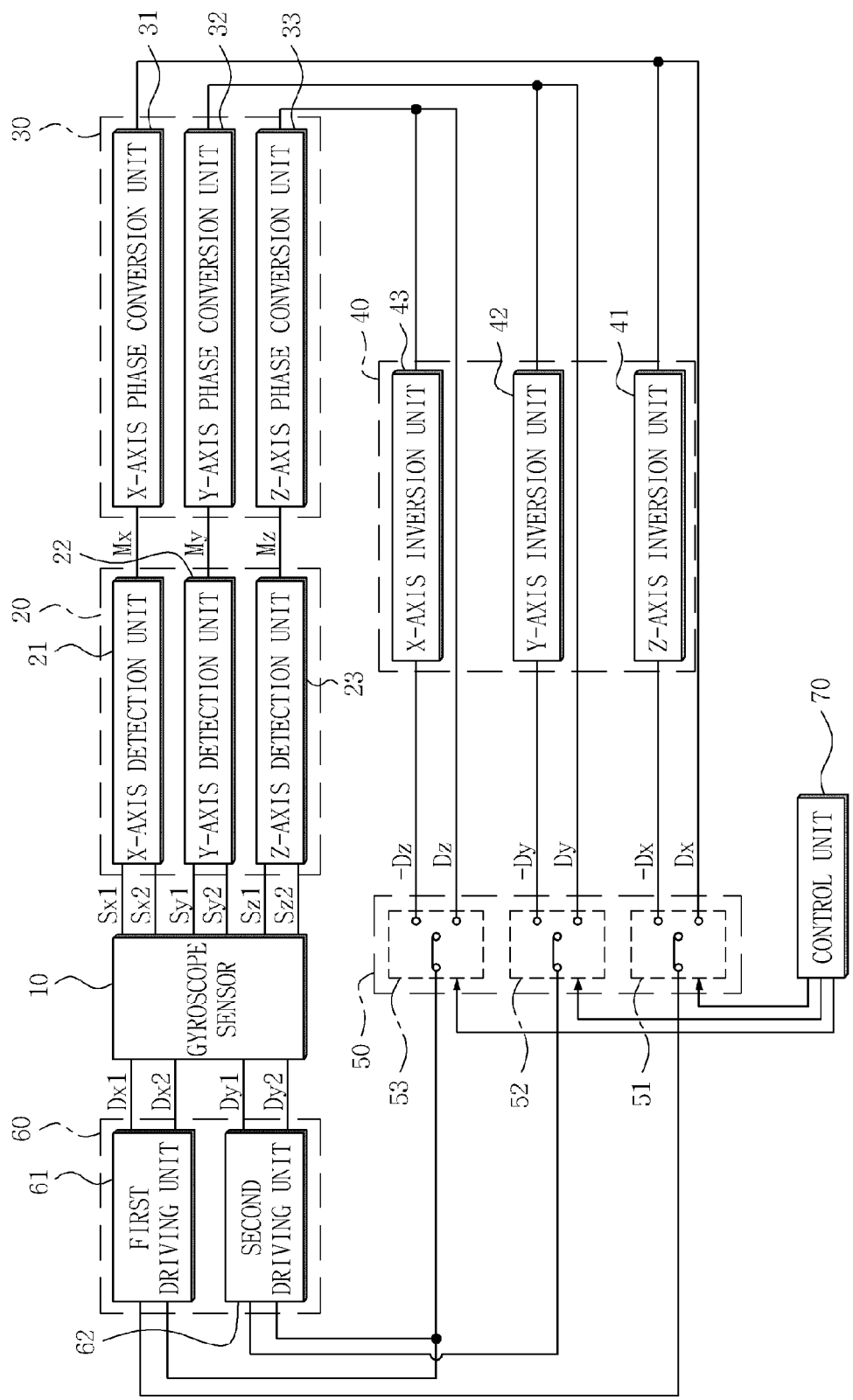
FIG. 1 is a block diagram of an apparatus of driving a gyroscope sensor according to a first preferred embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

FIG. 1 is a block diagram of an apparatus of driving a gyroscope sensor according to a first preferred embodiment of the present invention.

Referring to FIG. 1, the apparatus for driving a gyroscope sensor according to the first preferred embodiment of the present invention includes a detection module 20, a phase conversion module 30, an inversion module 40, a switch module 50, a driving module 60, and a control unit 70.

In this configuration, the detection module 20 detects and outputs voltage corresponding angular velocity of each axis of the gyroscope sensor 10 and includes an X-axis detection unit 21, a Y-axis detection unit 22, and a Z-axis detection unit 23.

Further, the phase conversion module 30 shifts a phase of voltage detected in the detection module 20 and outputs therefrom to generate driving voltage corresponding to each axis and includes an X-axis phase conversion unit 31, a Y-axis phase conversion unit 32, and a Z-axis phase conversion unit 33.

The inversion module 40 inverts the driving voltage output from the phase conversion module 30 to generate the inversion voltage corresponding to each axis and includes an X-axis inversion unit 41, a Y-axis inversion unit 42, and a Z-axis inversion unit 43.

In addition, the switch module 50 selects and outputs any one of the driving voltage output from the phase conversion module 30 and the inversion voltage output from the inversion module 40 for each axis according to a switching control signal and includes an X-axis switch unit 51, a Y-axis switch unit 52, and a Z-axis switch unit 53.

Further, the driving module 60 supplies the driving voltage of the driving axis passing through the switch module 50 to the driving electrode of the gyroscope sensor at the time of driving and supplies the inversion voltage of each axis to driving electrodes of each axis at the time of stopping the driving and includes a first driving unit 61 and a second driving unit 62.

In the above-mentioned configuration, the X-axis detection unit 21 configuring the detection module 20 detects and outputs X-axis voltage corresponding to angular velocity corresponding to a deformation due to Coriolis force of the driving gyroscope sensor 10 by a positive detection electrode and a negative detection electrode that are disposed on the X axis. In this configuration, when the output voltage from the positive detection electrode disposed on the X-axis is set to be Sx1 and the output voltage from the negative detection electrode disposed on the X axis is set to be Sx2, X-axis voltage Mx detected in the X-axis detection unit 21 and output therefrom is set to be Sx1-Sx2.

Further, the Y-axis detection unit 22 configuring the detection module 20 detects and outputs Y-axis voltage corresponding to the angular velocity corresponding to the deformation due to the Coriolis force of the driving gyroscope sensor 10 by the positive detection electrode and the negative detection electrode that are disposed on the Y axis. In this configuration, when the output voltage from the positive detection electrode disposed on the Y-axis is set to be Sy1 and the output voltage from the negative detection electrode disposed on the Y axis is set to be Sy2, Y-axis voltage My detected in the Y-axis detection unit 22 and output therefrom is set to be Sy1-Sy2.

Further, the Z-axis detection unit 23 configuring the detection module 20 detects and outputs Z-axis voltage corresponding to the angular velocity corresponding to the deformation due to the Coriolis force of the driving gyroscope sensor 10 by the positive detection electrode and the negative detection electrode that are disposed on the X axis and the positive detection electrode and the negative detection electrode that are disposed on the Y axis. Herein, when Z-axis voltage detect and output in and from the Z-axis detection unit 23 is set to be Mz, the Mz is set to be Sx1+Sx2+Sy1+Sy2.

Next, the X-axis phase conversion unit 31 configuring the phase conversion module 30 shifts the detection voltage output from the X-axis detection unit 21 by a predetermined phase to generate and output the X-axis driving voltage Dx.

Further, the Y-axis phase conversion unit 32 configuring the phase conversion module 30 shifts the detection voltage output from the Y-axis detection unit 22 by a predetermined phase to generate and output the Y-axis driving voltage Dy.

Further, the Z-axis phase conversion unit 33 configuring the phase conversion module 30 shifts the detection voltage output from the Z-axis detection unit 23 by a predetermined phase to generate and output the Z-axis driving voltage Dz.

Meanwhile, in order to stop the driving of the gyroscope sensor 10, the X-axis inversion unit 41 configuring the inversion module 40 inverts the X-axis driving voltage output from the X-axis phase conversion unit 31 to generate and output X-axis inversion voltage –Dx.

In order to stop the driving of the gyroscope sensor 10, the Y-axis inversion unit 42 configuring the inversion module 40 inverts the Y-axis driving voltage output from the Y-axis phase conversion unit 32 to generate and output Y-axis inversion voltage –Dy.

Further, in order to stop the driving of the gyroscope sensor 10, the Z-axis inversion unit 43 configuring the inversion module 40 inverts the Z-axis detection voltage output from the Z-axis phase conversion unit 33 to generate and output Z-axis inversion voltage –Dz.

As described above, when the driving voltage is generated from the phase conversion module 30 and the inversion voltage is generated from the inversion module 40, the switch module 50 selects and passes through the driving voltage or the inversion voltage by the control of the control unit 70.

That is, the X-axis switch unit 51 configuring the switch module 50 passes through the X-axis driving voltage output from the X-axis phase conversion unit 31 by the control of the control unit 70 at the time of the driving and passes through the X-axis inversion voltage output from the X-axis inversion unit 41 at the time of stopping the driving.

Further, the Y-axis switch unit 52 configuring the switch module 50 passes through the Y-axis driving voltage output from the Y-axis phase conversion unit 32 by the control of the control unit 70 at the time of the driving and passes through the Y-axis inversion voltage output from the Y-axis inversion unit 42 at the time of stopping the driving.

Further, the Z-axis switch unit 53 configuring the switch module 50 passes through the Z-axis driving voltage output from the Z-axis phase conversion unit 33 by the control of the control unit 70 at the time of the driving and passes through the Z-axis inversion voltage output from the Z-axis inversion unit 43 at the time of stopping the driving.

Meanwhile, the first driving unit 61 configuring the driving module 60 supplies the signal passing through the X-axis switch unit 51 to the positive driving electrode disposed on the X axis of the gyroscope sensor 10 so as to drive the gyroscope sensor 10 in the X-axis direction or stop the driving of the gyroscope sensor 10 (when driving the gyroscope sensor in the X-axis direction, the X-axis driving voltage is applied to the positive driving electrode and the X-axis inversion voltage is applied to the positive driving electrode so as to stop the driving of the gyroscope sensor in the X-axis direction) and inverts the signal passing through the X-axis switch unit 51 and supplies the inverted signal to the negative driving electrode disposed on the X axis of the gyroscope sensor 10 (when driving the gyroscope sensor in the X-axis direction, the X-axis inversion driving voltage inverting the X-axis driving voltage is applied to the negative driving electrode and the X-axis re-inversion voltage re-inverting the X-axis inversion voltage is applied to the negative driving electrode so as to stop the driving of the gyroscope sensor in the X-axis direction).

In addition, the first driving unit 61 supplies the signal passing through the Z-axis switch unit 53 to the positive driving electrode and the negative driving electrode disposed on the X axis of the gyroscope sensor 10 so as to drive the gyroscope sensor 10 in the Z-axis direction or stop the driving of the gyroscope sensor 10.

That is, the first driving unit 61 applies the Z-axis driving voltage to the positive driving electrode and the negative driving electrode when driving the gyroscope sensor 10 in the Z-axis direction and applies the Z-axis inversion voltage to the positive driving electrode and the negative driving electrode in order to stop the driving of the gyroscope sensor in the Z-axis direction.

As described above, in order for the first driving unit 61 to drive the gyroscope sensor 10 in the Z-axis direction, the second driving unit 62 needs to simultaneously supply the signal passing through the Z-axis switch unit 53 to the positive driving electrode and the negative driving electrode disposed on the Y axis of the gyroscope sensor 10 (which is equally applied even which the driving of the gyroscope sensor stops).

Next, the second driving unit 62 configuring the driving module 60 supplies the signal passing through the Y-axis switch unit 52 to the positive driving electrode disposed on the Y axis of the gyroscope sensor 10 so as to drive the gyroscope sensor 10 in the Y-axis direction or stop the driving of the gyroscope sensor 10 (when driving the gyroscope sensor in the Y-axis direction, the Y-axis inversion voltage is applied to the positive driving electrode) and inverts the signal passing through the Y-axis switch unit 52 and supplies the inverted signal to the negative driving electrode disposed on the Y axis of the gyroscope sensor 10 (when driving the gyroscope sensor in the Y-axis direction, the Y-axis inversion driving voltage inverting the Y-axis driving voltage is applied to the negative driving electrode and the Y-axis re-inversion voltage re-inverting the Y-axis inversion voltage is applied to the negative driving electrode so as to stop the driving of the gyroscope sensor in the Y-axis direction).

In addition, the second driving unit 62 supplies the signal passing through the Z-axis switch unit 53 to the positive driving electrode and the negative driving electrode disposed on the Y axis of the gyroscope sensor 10 so as to drive the gyroscope sensor 10 in the Z-axis direction or stop the driving of the gyroscope sensor 10.

That is, the second driving unit 62 applies the Z-axis driving voltage to the positive driving electrode and the negative driving electrode disposed on the Y axis when driving the gyroscope sensor 10 in the Z-axis direction and applies the Z-axis inversion voltage to the positive driving electrode and the negative driving electrode disposed on the Y axis in order to stop the driving of the gyroscope sensor in the Z-axis direction.

As described above, in order for the second driving unit 62 to drive the gyroscope sensor 10 in the Z-axis direction, the first driving unit 61 needs to supply the signal passing through the Z-axis switch unit 53 of the gyroscope sensor 10 to the positive driving electrode and the negative driving electrode disposed on the X axis of the gyroscope sensor 10 (which is equally applied even which the driving of the gyroscope sensor stops).

Meanwhile, the control unit 70 controls the switch module 50 by the switching control signal to pass through the driving voltage at the time of the driving of the gyroscope sensor 10 and pass through the inversion voltage at the time of stopping the driving of the gyroscope sensor 10.

That is, the control unit 70 controls the X-axis switch unit 51 by the switching control signal to pass the X-axis driving voltage to the first driving unit 61 so as to drive the gyroscope sensor 10 in the X axis and controls the switch module 50 by the switching control signal sensor to pass the inversion voltage to the first driving unit 61 and the second driving unit 62 at the time of stopping the driving.

Further, the control unit 70 controls the Y-axis switch unit 52 by the switching control signal to pass the Y-axis driving voltage to the second driving unit 62 so as to drive the gyroscope sensor 10 in the Y axis and controls the switching control signal by the switch module 50 to pass the inversion voltage to the first driving unit 61 and the second driving unit 62 at the time of stopping the driving.

In addition, the control unit 70 controls the Z-axis switch unit 53 by the switching control signal to pass the Z-axis driving voltage to the first driving unit 61 and the second driving unit 62 so as to drive the gyroscope sensor 10 in the Z axis and controls the switch module 50 by the switching control signal to pass the inversion voltage to the first driving unit 61 and the second driving unit 62 at the time of stopping the driving.

An operation of the apparatus for driving a gyroscope sensor according to the first preferred embodiment of the present invention will now be described with reference to FIG. 1.

The gyroscope sensor 10 needs to be driven in at least two-axis direction so as to measure more than three axes, that is, multi-axis angular velocity.

Further, the operation may be repeatedly operated based on one period, for example, 'X-axis driving (Z-axis angular velocity measurement)—stop—Z-axis driving (Y-axis angular velocity and X-axis angular velocity measurement)—stop'.

To this end, the control unit 70 controls the first switch unit 51 to supply the X-axis driving voltage to the X-axis positive driving electrode disposed on the X axis of the gyroscope sensor 10 and supply the X-axis inversion driving voltage to the X-axis negative driving electrode to generate vibration and the gyroscope sensor 10 outputs voltage corresponding to angular velocity corresponding to a deformation occurring by the vibration and the Coriolis force through the X-axis positive detection electrode and the negative detection electrode.

Further, the X-axis detection unit 21 detects the voltage output from the X-axis detection electrode of the gyroscope sensor 10 and applies the detection voltage MX to the X-axis phase conversion unit 31.

Meanwhile, the X-axis phase conversion unit 31 shifts the voltage from the X-axis detection unit 21 by the predetermined phase to generate the driving voltage Dx so as to satisfy an oscillation phase condition.

In this case, the control unit 70 controls the X-axis switch unit 51 to pass the driving voltage generated from the X-axis phase conversion unit 31 to the first driving unit 61.

As described above, when the driving voltage generated from the X-axis phase conversion unit 31 through the X-axis switch unit 51 is applied to the first driving unit 61, the first driving unit 61 supplies the X-axis driving voltage to the X-axis positive driving electrode of the gyroscope sensor 10 and supplies the X-axis inversion driving voltage inverting the X-axis driving voltage to the negative driving electrode to continue to vibrate the gyroscope sensor 10 (In this case, the angular velocity $\Omega z$ in the Z direction is measured by the Coriolis force in the Y-axis direction through the Y-axis detection unit).

Thereafter, in order to effectively stop the vibration of the gyroscope sensor 10 that is being presently vibrated due to a need to switch a vibration axis of the gyroscope sensor 10 at a predetermined time, a reverse driving voltage to the vibrating direction is applied.

However, when only the reverse driving voltage to the vibrating direction of the gyroscope sensor 10 is applied, the stop time of the gyroscope sensor 10 is delayed because a vibration in other-axis directions other than the vibrating axis direction is not removed.

The reason is that the gyroscope sensor 10 is generally vibrated in other-axis directions other than the driving direction thereof due to asymmetry or external force of the gyroscope sensor 10 in the case of the multi-axis driving gyroscope sensor 10. Therefore, when the vibration in other-axis directions is not removed, the stop time of the gyroscope sensor 10 is delayed.

Therefore, in the preferred embodiment of the present invention, the vibration of the gyroscope sensor 10 effectively stops by providing the reverse driving voltage to the vibration of the gyroscope sensor 10 in other-axis direction other than a driving axis.

To this end, the control unit 70 controls the switch module to pass through the inversion voltage inverted in the inversion module 40.

In this case, when the X-axis switch unit 51 and the Z-axis switch unit 53 passes through the X-axis inversion voltage and the Z-axis inversion voltage that are inverted in the X-axis inversion unit 41 and the Z-axis inversion unit 43 by the control of the control unit 70, the first driving unit 61 applies the X-axis inversion voltage and the Z-axis inversion voltage to the X-axis positive driving electrode of the gyroscope sensor 10 and applies the X-axis re-inversion voltage (=X-axis driving voltage) and the Z-axis inversion voltage to the X-axis negative driving electrode of the gyroscope sensor 10.

Further, when the Y-axis switch unit 52 and the Z-axis switch unit 53 passes through the Y-axis inversion voltage and the Z-axis inversion voltage that are inverted in the Y-axis inversion unit 42 and the Z-axis inversion unit 43 by the control of the control unit 70, the second driving unit 62 applies the Y-axis inversion voltage and the Z-axis inversion voltage to the Y-axis positive driving electrode of the gyroscope sensor 10 and applies the Y-axis re-inversion voltage (=Y-axis driving voltage) and the Z-axis inversion voltage to the Y-axis negative driving electrode of the gyroscope sensor 10.

As described above, when the reverse driving voltage to the vibration in the X-axis direction is input to the driving gyroscope sensor 10 and the same reverse driving voltage is input to other axes, that is, the Y axis and the Z axis other than the X-axis direction, the vibration in the driving direction and the vibration of other axes are effectively removed, thereby shortening the stop time of the gyroscope sensor 10.

Meanwhile, the control unit 70 controls the Z-axis switch unit 53 to pass the driving voltage generated from the Z-axis phase conversion unit 33 to the first driving unit 61 and the second driving unit 62 when intending to vibrate the gyroscope sensor 10 in the Z-axis direction, if a predetermined time lapses after the driving of the gyroscope sensor 10 stops.

As described above, when the driving voltage generated from the Z-axis phase conversion unit 33 through the Z-axis switch unit 53 is applied to the first driving unit 61 and the second driving unit 62, the first driving unit 61 supplies the Z-axis driving voltage to the X-axis positive driving electrode of the gyroscope sensor 10 and the negative driving electrode, respectively, and the second driving unit 62 also supplies the Z-axis driving voltage to the Y-axis positive driving electrode and the negative driving electrode of the gyroscope sensor 10, thereby vibrating the gyroscope sensor 10 in the Z-axis direction (in this case, the angular velocity in the X direction may be measured by measuring the Coriolis force in the Y-axis direction through the Y-axis detection unit and the angular velocity in the Y direction may be measured by measuring the Coriolis force in the X axis direction through the X-axis detection unit).

Thereafter, in order to effectively stop the vibration of the gyroscope sensor 10 that is being presently vibrated due to a need to switch the vibration axis of the gyroscope sensor 10 at a predetermined time, the reverse driving voltage to the vibrating axis direction and other-axis vibrations needs to be applied.

The above-mentioned operation is the same as the operation performed so as to stop the gyroscope sensor when the gyroscope sensor 10 is vibrated in the X-axis direction and therefore, the detailed description thereof will be omitted.

Further, the control unit 70 controls the Y-axis switch unit 52 to pass the driving voltage generated from the Y-axis phase conversion unit 32 to the second driving unit 62, when there is a need to perform the Y-axis driving.

As described above, when the driving voltage generated from the Y-axis phase conversion unit 32 through the Y-axis switch unit 52 is applied to the second driving unit 62, the second driving unit 62 supplies the Y-axis driving voltage to the Y-axis positive driving electrode of the gyroscope sensor 10 and supplies the Y-axis inversion driving voltage inverting the Y-axis driving voltage to the negative driving electrode to vibrate the gyroscope sensor 10 in the Y-axis direction.

Thereafter, in order to effectively stop the vibration of the gyroscope sensor 10 that is being presently vibrated due to a need to switch the vibration axis of the gyroscope sensor 10 at a predetermined time, the reverse driving voltage to the vibrating axis direction and other axes is applied.

The above-mentioned operation is the same as the operation performed so as to stop the gyroscope sensor when the gyroscope sensor 10 is vibrated in the X-axis direction and therefore, the detailed description thereof will be omitted.

Figure 2A:
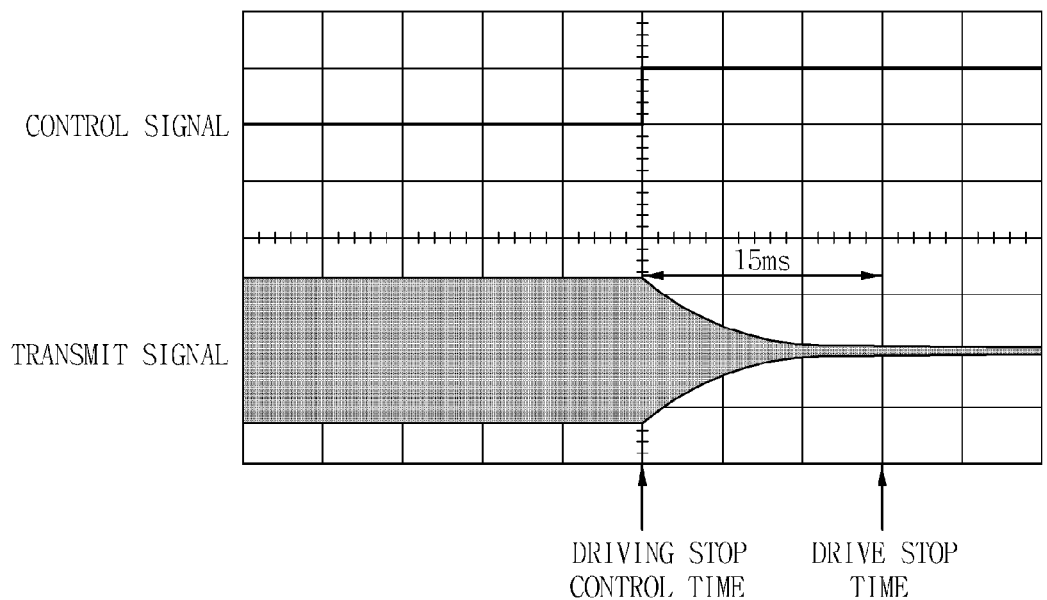
FIG. 2A is a diagram showing oscillation characteristics according to the prior art and FIG. 2B is a diagram showing oscillation characteristics according to a preferred embodiment of the present invention.

Meanwhile, referring to FIG. 2A, when the reverse stop is not used, a braking time consumed from a driving stop control time to an actual driving stop time is long to approximately 15 ms. Therefore, in this case, since the braking time for changing the axis at the multi-axis gyroscope sensor is long, the measurement time may be long.

Figure 2B:
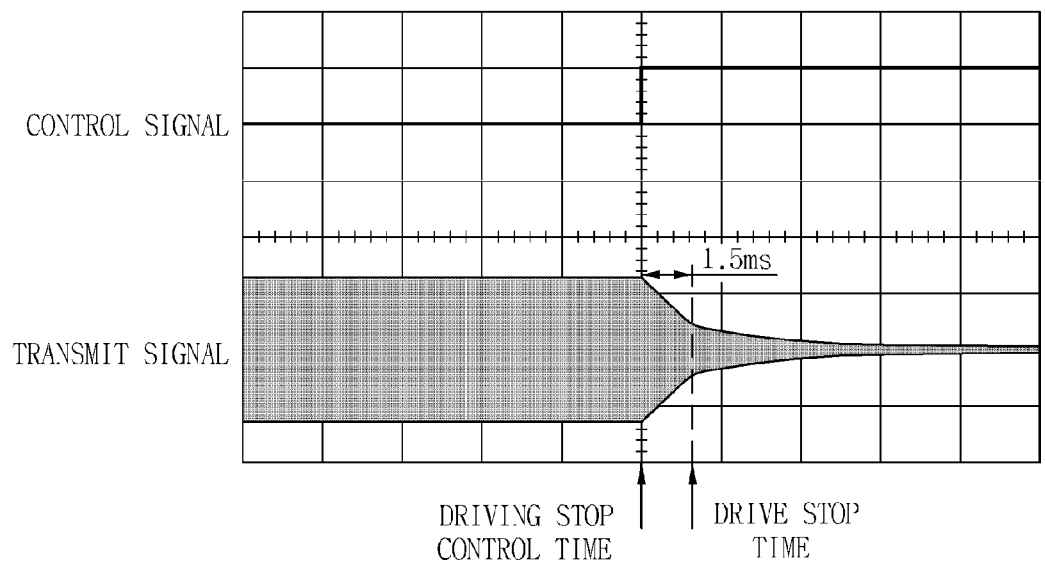

On the other hand, referring to FIG. 2B, when the reverse stop using the inversion voltage applied from the inversion unit of the preferred embodiment of the present invention is used, the braking time consumed from the driving stop control time to the actual driving stop time is relatively shorter to approximately 1.5 ms. Therefore, according to the preferred embodiment of the present invention, since the braking time for changing the axis at the multi-axis gyroscope sensor is short, the measurement is relatively much more rapidly performed.

In the preferred embodiment of the present invention as described above, when self-oscillation of the gyroscope sensor stops using the reverse driving, the self-oscillation may stop more rapidly than when the reverse driving is not performed. For example, prior to using the inversion driving, the stop time is 15 ms. On the other hand, according to the preferred embodiment of the present invention, when the inversion driving is used, the stop time may be shortened to 1.5 ms.

The apparatus for driving a gyroscope sensor according to the preferred embodiment of the present invention is easy to randomly change the driving direction of the gyroscope sensor and may perform more rapidly sampling, when the multi-axis gyroscope sensor is measured by the multi axis.

Figure 3:
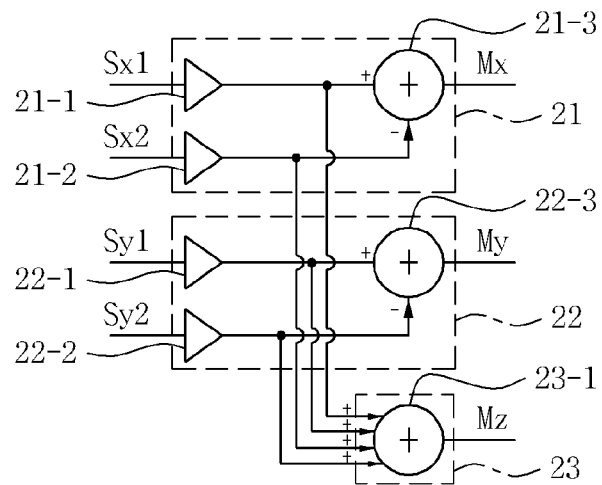
FIG. 3 is a detailed block diagram of a detection unit of FIG. 1.

FIG. 3 is a detailed block diagram of the detection unit of FIG. 1.

Referring to FIG. 3, the X-axis detection unit 21 includes a first detection amplifier 21-1, a second detection amplifier 21-2, and a first detection subtractor 21-3, the Y-axis detection unit 22 includes a third detection amplifier 22-1, a fourth detection amplifier 22-2, and a second detection subtractor 22-3, and the Z-axis detection unit 23 includes a first detection adder 23-1.

In the X-axis detection unit 21, the first detection amplifier 21-1 amplifies and outputs the signal output from the X-axis positive detection electrode disposed on the X axis and the second detection amplifier 21-2 amplifies and outputs the signal output from the X-axis negative detection electrode disposed on the X axis.

In this case, the first detection subtractor 21-3 outputs the detection voltage Mx calculated by subtracting the output voltage Sx2 of the X-axis negative detection electrode output from the second detection amplifier 21-2 from the output voltage Sx1 of the X-axis positive detection electrode output from the first detection amplifier 21-1.

Next, In the Y-axis detection unit 22, the third detection amplifier 22-1 amplifies and outputs the signal output from the Y-axis positive detection electrode disposed on the Y axis and the fourth detection amplifier 22-2 amplifies and outputs the signal output from the Y-axis negative detection electrode disposed on the Y axis.

In this case, the second detection subtractor 22-3 outputs the detection voltage My calculated by subtracting the output voltage Sy2 of the Y-axis negative detection electrode output from the fourth detection amplifier 22-2 from the output voltage Sy1 of the Y-axis positive detection electrode output from the third detection amplifier 22-1.

Meanwhile, in the Z-axis detection unit 23, the first detection adder 23-1 outputs the detection voltage Mz calculated by adding the output voltage Sx1 of the X-axis positive detection electrode output from the first detection amplifier 21-1, the output voltage Sx2 of the X-axis negative detection electrode output from the second detection amplifier 21-2, the output voltage Sy1 of the Y-axis positive detection electrode output from the third detection amplifier 22-1, and the output voltage Sy2 of the Y-axis negative detection electrode output from the fourth detection amplifier 22-2

Figure 4:
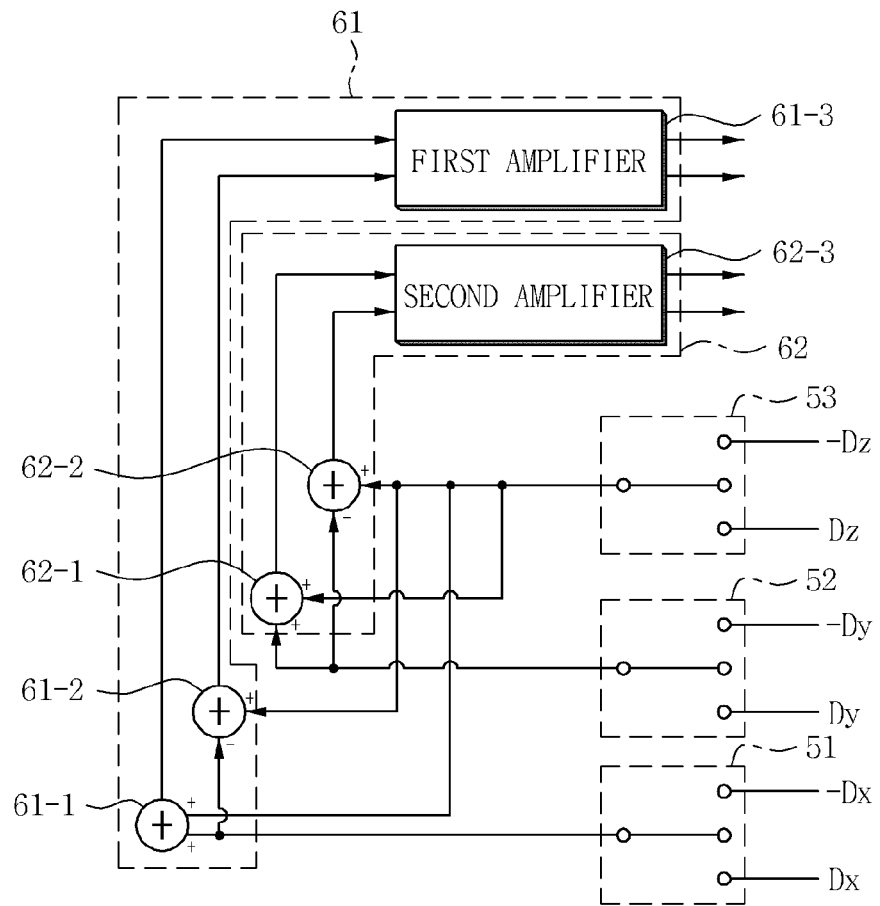
FIG. 4 is a detailed block diagram of a first driving unit and a second driving unit of FIG. 1.

FIG. 4 is a detailed block diagram of the first driving unit and the second driving unit of FIG. 1.

Referring to FIG. 4, the first driving unit 61 includes a first driving adder 61-1, a first driving subtractor 61-2 includes a first driving adder 61-1, a first driving subtractor 61-2, and a first driving amplifier 61-3 and the second driving unit 62 includes a second driving adder 62-1, a second driving subtractor 62-2, and a second driving amplifier 62-3.

The first driving adder 61-1 of the first driving unit 61 is connected to the X-axis switch unit 51 and the Z-axis switch unit 53. In this configuration, the X-axis switch unit 51 performs the switching operation according to the switching control signal of the control unit 70 to pass the driving voltage output from the X-axis phase conversion unit 31 or pass the inversion voltage output from the X-axis inversion unit 41.

Further, the Z-axis switch unit 53 performs the switching operation according to the switching control signal of the control unit 70 to pass the driving voltage output from the Z-axis phase conversion unit 33 or pass the inversion voltage output from the Z-axis inversion unit 43.

Therefore, the first driving adder 61-1 of the first driving unit 61 passes or adds and outputs the X-axis driving voltage or the X-axis inversion voltage passing through the X-axis switch unit 51 and the Z-axis driving voltage or the Z-axis inversion voltage passing through the Z-axis switch unit 53, respectively.

Further, the first driving subtractor 61-2 of which + terminal is connected to the Z-axis switch unit 53 and − terminal is connected to the X-axis switch unit 51.

Therefore, the first driving subtractor 61-2 passes the Z-axis driving voltage or the Z-axis inversion voltage signal passing through the Z-axis switch unit 53, inverts and outputs the X-axis driving voltage or the X-axis inversion voltage passing through the X-axis switch unit 51, or outputs the signal subtracting the X-axis driving voltage or the X-axis inversion voltage passing through the X-axis switch unit 51 from the Z-axis driving voltage or the Z-axis inversion voltage passing through the Z-axis switch unit 53.

In this configuration, outputting the signal subtracting the X-axis driving voltage or the X-axis inversion voltage passing through the X-axis switch unit 51 from the Z-axis driving voltage or the Z-axis inversion voltage passing through the Z-axis switch unit 53 by the first driving subtractor 61-2 is the same as actually passing the Z-axis driving voltage or the Z-axis inversion voltage passing through the Z-axis switch unit 53 and outputting the X-axis inversion driving voltage or the X-axis re-inversion voltage inverted by inverting the X-axis driving voltage or the X-axis inversion voltage passing through the X-axis switch unit 51.

The first driving amplifier 61-3 amplifies the voltage (X-axis driving voltage, X-axis inversion voltage, Z-axis driving voltage, or Z-axis inversion voltage) output from the first driving adder 61-1 and applies the amplified voltage to the positive driving electrode disposed on the X axis of the gyroscope sensor 10 and amplifies the voltage (X-axis inversion driving voltage, X-axis re-inversion voltage, Z-axis driving voltage, or Z-axis inversion voltage) output from the first driving subtractor 61-2 and applies the amplified voltage to the negative driving electrode disposed on the X axis of the gyroscope sensor 10.

Next, the second driving adder 62-1 of the second driving unit 62 is connected to the Y-axis switch unit 52 and the Z-axis switch unit 53. In this configuration, the Y-axis switch unit 52 performs the switching operation according to the switching control signal of the control unit 70 to pass the driving voltage output from the Y-axis phase conversion unit 32 or pass the inversion voltage output from the Y-axis inversion unit 42.

Therefore, the second driving adder 62-1 of the second driving unit 62 passes the Y-axis driving voltage or the Y-axis inversion voltage passing through the Y-axis switch unit 52 or passes the Z-axis driving voltage or the Z-axis inversion voltage passing through the Z-axis switch unit 53, respectively, or adds and outputs the Z-axis driving voltage or the Z-axis inversion voltage passing through the Z-axis switch unit 53 to the Y-axis driving voltage or the Y-axis inversion voltage passing through the Y-axis switch unit 52.

Further, the second driving subtractor 62-2 of which + terminal is connected to the Z-axis switch unit 53 and − terminal is connected to the Y-axis switch unit 52.

Therefore, the second driving subtractor 62-2 passes the Z-axis driving voltage or the Z-axis inversion voltage signal passing through the Z-axis switch unit 53, inverts and outputs the Y-axis driving voltage or the Y-axis inversion voltage passing through the Y-axis switch unit 52, respectively, or outputs the signal subtracting the Y-axis driving voltage or the Y-axis inversion voltage passing through the Y-axis switch unit from the Z-axis driving voltage or the Z-axis inversion voltage passing through the Z-axis switch unit 53.

In this configuration, outputting the signal subtracting the Y-axis driving voltage or the Y-axis inversion voltage passing through the Y-axis switch unit 52 from the Z-axis driving voltage or the Z-axis inversion voltage passing through the Z-axis switch unit 53 by the second driving subtractor 62-2 is the same as actually passing the Z-axis driving voltage or the Z-axis inversion voltage passing through the Z-axis switch unit 53 and outputting the Y-axis inversion driving voltage or the Y-axis re-inversion voltage inverted by inverting the Y-axis driving voltage or the Y-axis inversion voltage passing through the Y-axis switch unit 52.

Figure 5:
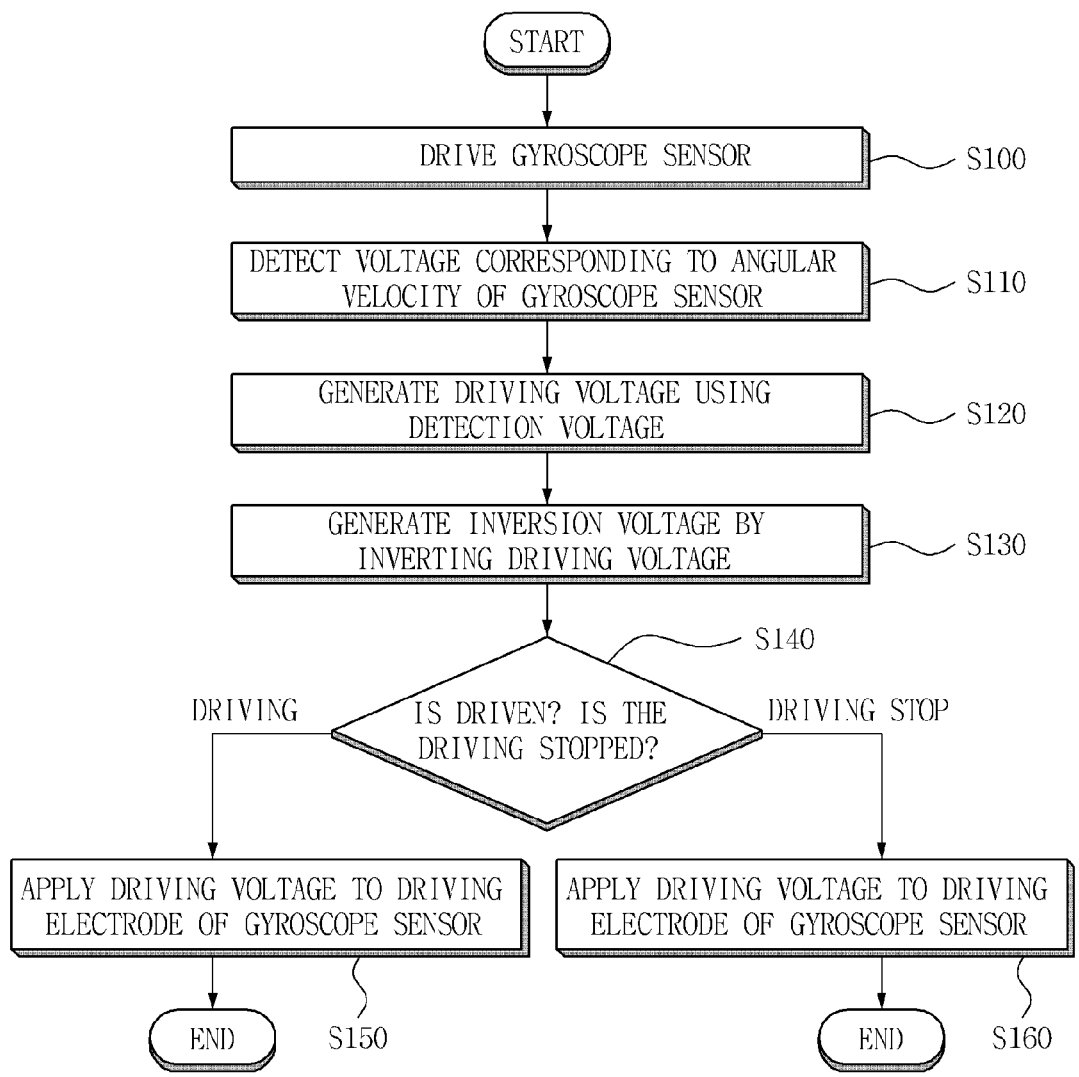
FIG. 5 is a flow chart of a method of driving a gyroscope sensor according to the first preferred embodiment of the present invention.

FIG. 5 is a flow chart of a method of driving a gyroscope sensor according to the first preferred embodiment of the present invention.

Referring to FIG. 5, in the method for driving a gyroscope sensor according to the first preferred embodiment of the present invention, the control unit 70 first controls the first switch unit 51 configuring the switch module 50 to supply the X-axis driving voltage to the X-axis positive driving electrode disposed on the X axis of the gyroscope sensor 10 so as to drive the gyroscope sensor 10 in the X axis to and applies the X-axis inversion driving voltage to the X-axis negative driving electrode to generate the vibration (S100).

Then, the detection module 20 detects the voltage corresponding to the angular velocity of each axis of the gyroscope sensor 10 through the detection electrode of the corresponding axis (S110).

Describing this in more detail, the X-axis detection unit 21 configuring the detection module 20 detects and outputs the X-axis voltage corresponding to the deformation due to the Coriolis force of the driving gyroscope sensor 10 through the positive detection electrode and the negative detection electrode that are disposed on the X axis.

Further, the Y-axis detection unit 22 configuring the detection module 20 detects and outputs the Y-axis voltage corresponding to the deformation due to the Coriolis force of the driving gyroscope sensor 10 by the positive detection electrode and the negative detection electrode that are disposed on the Y axis.

Further, the Z-axis detection unit 23 configuring the detection module 20 detects and outputs the Z-axis voltage corresponding to the deformation due to the Coriolis force of the driving gyroscope sensor 10 by the positive detection electrode and the negative detection electrode that are disposed on the X axis and the positive detection electrode and the negative detection electrode that are disposed on the Y axis.

Next, the phase conversion module 30 shifts the phase of the voltage of each axis detected in the detection module 20 to generate the driving voltage corresponding to each axis (S120).

Describing this in more detail, the X-axis phase conversion unit 31 configuring the phase conversion module 30 shifts the detection voltage output from the X-axis detection unit 21 by a predetermined phase to generate and output the X-axis driving voltage Dx.

Further, the Y-axis phase conversion unit 32 configuring the phase conversion module 30 shifts the detection voltage output from the Y-axis detection unit 22 by a predetermined phase to generate and output the Y-axis driving voltage Dy.

Further, the Z-axis phase conversion unit 33 configuring the phase conversion module 30 shifts the detection voltage output from the Z-axis detection unit 23 by a predetermined phase to generate and output the Z-axis driving voltage Dz.

Meanwhile, the inversion module 40 inverts the driving voltage corresponding to each axis of the phase conversion module to generate the inversion voltage corresponding to each axis (S130).

Meanwhile, so as to stop the driving of the gyroscope sensor 10, the X-axis inversion unit 41 configuring the inversion module 40 inverts the X-axis driving voltage output from the X-axis phase conversion unit 31 to generate and output X-axis inversion voltage −Dx.

Further, in order to stop the driving of the gyroscope sensor 10, the Y-axis inversion unit 42 configuring the inversion module 40 inverts the Y-axis driving voltage output from the Y-axis phase conversion unit 32 to generate and output Y-axis inversion voltage −Dy.

Further, in order to stop the driving of the gyroscope sensor 10, the Z-axis inversion unit 43 configuring the inversion module 40 inverts the Z-axis detection voltage output from the Z-axis phase conversion unit 33 to generate and output Z-axis inversion voltage −Dz.

Thereafter, the control unit 70 determines whether the gyroscope sensor 10 is driven or the driving of thereof stops (S140). If it is determined that the gyroscope sensor 10 is driven, the control unit 70 controls the switch module 50 and the driving module 60 to supply the driving voltage corresponding to the driving axis in the driving voltage output from the phase conversion module 30 to the gyroscope sensor 10 (S150) and if its determined that the driving of the gyroscope sensor 10 stops, the control unit 70 controls the switch module 50 and the driving module 60 to supply the inversion voltage of each axis output from the inversion module 40 when the driving of the gyroscope sensor 10 stops to the driving electrode of the gyroscope sensor 10 (S160).

Describing this in more detail, the control unit 70 first controls the X-axis switch unit 51 during the driving to pass the driving voltage generated from the X-axis phase conversion unit 31 to the first driving unit 61 configuring the driving module 60.

As described above, when the driving voltage generated from the X-axis phase conversion unit 31 through the X-axis switch unit 51 is provided to the first driving unit 61, the first driving unit 61 supplies to the X-axis positive driving electrode of the gyroscope sensor 10 to the X-axis driving voltage and supplies the X-axis inversion driving voltage inverting the X-axis driving voltage to the negative driving electrode to continue to vibrate the gyroscope sensor 10 (In this case, the angular velocity Ωz in the Z direction is measured by the Coriolis force in the Y-axis direction through the Y-axis detection unit).

Differently therefrom, the control unit 70 determines whether the gyroscope sensor 10 is driven or the driving thereof is stop (S140). If it is determined that the driving of the gyroscope sensor 10 stops, the control unit 70 controls the switch module 50 to pass the inversion voltage inverted in the inversion module 40.

In this case, when the X-axis switch unit 51 and the Z-axis switch unit 53 passes through the X-axis inversion voltage and the Z-axis inversion voltage that are inverted in the X-axis inversion unit 41 and the Z-axis inversion unit 43 by the control of the control unit 70, the first driving unit 61 provides the X-axis inversion voltage and the Z-axis inversion voltage to the X-axis positive driving electrode of the gyroscope sensor 10 and provides the X-axis re-inversion voltage (=X-axis driving voltage) and the Z-axis inversion voltage to the X-axis negative driving electrode of the gyroscope sensor 10.

Further, when the Y-axis switch unit 52 and the Z-axis switch unit 53 passes through the Y-axis inversion voltage and the Z-axis inversion voltage that are inverted in the Y-axis inversion unit 42 and the Z-axis inversion unit 43 by the control of the control unit 70, the second driving unit 62 configuring the driving module 60 provides the Y-axis inversion voltage and the Z-axis inversion voltage to the Y-axis positive driving electrode of the gyroscope sensor 10 and provides the Y-axis re-inversion voltage (=Y-axis driving voltage) and the Z-axis inversion voltage to the Y-axis negative driving electrode of the gyroscope sensor 10.

As described above, when the reverse driving voltage to the vibration in the X-axis direction is input to the driving gyroscope sensor 10 and the same reverse driving voltage is input to other axes, that is, the Y axis and the Z axis other than the X-axis direction, the vibration in the driving direction and the vibration of other axes are effectively removed, thereby shortening the stop time of the gyroscope sensor 10.

Meanwhile, the control unit 70 repeatedly performs S100 to S160 for the Z-axis direction, when intending to vibrate the gyroscope sensor 10 in the Z-axis direction, if a predetermined time lapses after the driving of the gyroscope sensor 10 stops.

Describing this in more detail, the control unit 70 controls the Z-axis switch unit 53 to pass the driving voltage generated from the Z-axis phase conversion unit 33 to the first driving unit 61 and the second driving unit 62.

As described above, when the driving voltage generated from the Z-axis phase conversion unit 33 through the Z-axis switch unit 53 is provided to the first driving unit 61 and the second driving unit 62, the first driving unit 61 supplies the Z-axis driving voltage to the X-axis positive driving electrode and the negative driving electrode of the gyroscopes sensor 10, respectively, and the second driving unit 62 also supplies the Z-axis driving voltage to the Y-axis positive driving electrode and the negative driving electrode of the gyroscope sensor 10, thereby vibrating the gyroscope sensor 10 in the Z-axis direction (in this case, the angular velocity in the X direction may be measured by measuring the Coriolis force in the Y-axis direction through the Y-axis detection unit and the angular velocity in the Y direction may be measured by measuring the Coriolis force in the X axis direction through the X-axis detection unit).

Thereafter, in order to effectively stop the vibration of the gyroscope sensor 10 that is being presently vibrated due to a need to switch the vibration axis of the gyroscope sensor 10 at a predetermined time, the reverse driving voltage to the vibrating axis direction and other-axis vibrations needs to be provided.

The above-mentioned operation is the same as the operation performed so as to stop the gyroscope sensor when the gyroscope sensor 10 is vibrated in the X-axis direction and therefore, the detailed description thereof will be omitted.

Further, the control unit 70 repeatedly performs S100 to S160 for the Y-axis direction when the Y-axis driving is needed.

That is, the control unit 70 controls the Y-axis switch unit 52 to pass the driving voltage generated from the Y-axis phase conversion unit 32 to the second driving unit 62.

As described above, when the driving voltage generated from the Y-axis phase conversion unit 32 through the Y-axis switch unit 52 is provided to the second driving unit 62, the second driving unit 62 supplies the Y-axis driving voltage to the Y-axis positive driving electrode of the gyroscope sensor 10 and supplies the Y-axis inversion driving voltage inverting the Y-axis driving voltage to the negative driving electrode to vibrate the gyroscope sensor 10 in the Y-axis direction.

Thereafter, in order to effectively stop the vibration of the gyroscope sensor 10 that is being presently vibrated due to a need to switch the vibration axis of the gyroscope sensor 10 at a predetermined time, the reverse driving voltage to the vibrating axis direction and other axes is provided.

The above-mentioned operation is the same as the operation performed so as to stop the gyroscope sensor when the gyroscope sensor 10 is vibrated in the X-axis direction and therefore, the detailed description thereof will be omitted.

In the method for driving the gyroscope sensor according to the preferred embodiment of the present invention as described above, when the self-oscillation of the gyroscope sensor stops using the reverse driving, the self-oscillation may stop more rapidly than when the reverse driving is not performed.

The method for driving a gyroscope sensor according to the preferred embodiment of the present invention is easy to randomly change the driving direction of the gyroscope sensor and may perform more rapidly sampling, when the multi-axis gyroscope sensor is measured by the multi axis.

As set forth above, the exemplary embodiments of the present invention can rapidly perform the driving of the gyroscope sensor, rapidly perform the axis change in the multi-axis gyroscope sensor, and perform the multi-axis sensing at a high speed, by detecting the motion of the sensor in the gyroscope sensor and performing the reverse driving to the motion of the detected sensor.

In addition, the exemplary embodiments of the present invention can obtain the high measurement frequency bandwidth by minimizing the stop time when performing the multi-axis sensing using the gyroscope sensor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. An apparatus for driving a gyroscope sensor, comprising:
    a detection module detecting and outputting voltage corresponding to angular velocity of each axis of a gyroscope sensor;
    a phase conversion module generating driving voltage corresponding to each axis by shifting a phase of voltage detected in the detection module and output therefrom;
    an inversion module inverting driving voltage output from the phase conversion module and generating inversion voltage corresponding to each axis;
    a switch module selecting any one of the driving voltage output from the phase conversion module and the inversion voltage output from the inversion module according to a switching control signal for each axis;
    a driving module supplying driving voltage of a driving axis passing through the switch module to driving electrodes of the gyroscope sensor in order to drive in driving stop conditions and supplying the inversion voltage of each axis to the driving electrodes of each axis of the gyroscope sensor in order to stop driving in driving conditions; and
    a control unit passing the driving voltage of the driving axis by controlling the switch module using a switching control signal in order to drive in driving stop conditions and passing the inversion voltage of each axis by controlling the switch module according to the switching control signal in order to stop driving in driving conditions,
    wherein the detection module includes:
        a first detection unit detecting voltage corresponding to angular velocity of a first axis of the gyroscope sensor through a first-axis detection electrode;
        a second detection unit detecting voltage corresponding to angular velocity of a second axis of the gyroscope sensor through a second-axis detection electrode; and
        a third detection unit detecting voltage corresponding to angular velocity of a third axis of the gyroscope sensor through the first-axis detection electrode and the second-axis detection electrode,
    wherein the driving module applies driving voltage of the first axis to positive driving electrodes of the first axis, voltage which reverses the driving voltage of the first axis to negative driving electrodes of the first axis, the driving voltage of the second axis to the positive driving electrodes of the second axis, voltage which reverses the driving voltage of the second axis to the negative driving electrodes of the second axis, and
    wherein the driving electrode of the third axis is provided to the positive driving electrodes of the first axis and the negative driving electrodes of the first axis, and to the positive driving electrodes of the second axis and the negative driving electrodes of the second axis.

2. The apparatus as set forth in claim 1, wherein the first detection unit includes:
    a first detection amplifier receiving, amplifying, and outputting the output voltage of a first-axis positive detection electrode of the gyroscope sensor;
    a second detection amplifier receiving, amplifying, and outputting the output voltage of a first-axis negative detection electrode of the gyroscope sensor; and
    a first detection subtractor subtracting the output voltage of the second detection amplifier from the output voltage of the first detection amplifier to detect and output the voltage corresponding to the angular velocity of the first axis of the gyroscope sensor.

3. The apparatus as set forth in claim 1, wherein the second detection unit includes:
    a third detection amplifier receiving, amplifying, and outputting the output voltage of a second-axis positive detection electrode of the gyroscope sensor;
    a fourth detection amplifier receiving, amplifying, and outputting the output voltage of a second-axis negative detection electrode of the gyroscope sensor; and
    a second detection subtractor subtracting the output voltage of the fourth detection amplifier from the output voltage of the third detection amplifier to detect and output the voltage corresponding to the angular velocity of the second axis of the gyroscope sensor.

4. The apparatus as set forth in claim 1, wherein the third detection unit includes a first detection adder adding the output voltage of the first-axis positive detection electrode of the gyroscope sensor, the output voltage of the first-axis negative detection electrode, the output voltage of the second-axis positive detection electrode, and the output voltage of the second-axis negative detection electrode to detect and output voltage corresponding to angular velocity of the third axis of the gyroscope sensor.

5. The apparatus as set forth in claim 1, wherein the phase conversion module includes:
   a first phase conversion unit generating first-axis driving voltage by shifting the phase of voltage output from the first detection unit;
   a second phase conversion unit generating second-axis driving voltage by shifting the phase of voltage output from the second detection unit; and
   a third phase conversion unit generating third-axis driving voltage by shifting the phase of voltage output from the third detection unit.

6. The apparatus as set forth in claim 5, wherein the inversion module includes:
   a first inversion unit inverting the driving voltage output from the first phase conversion unit to generate inversion voltage corresponding to the first axis;
   a second inversion unit inverting the driving voltage output from the second phase conversion unit to generate inversion voltage corresponding to the second axis; and
   a third inversion unit invert the driving voltage output from the third phase conversion unit to generate inversion voltage corresponding to the third axis.

7. The apparatus as set forth in claim 6, wherein the switch module includes:
   a first switch unit selecting and passing any one of the driving voltage output from the first phase conversion unit and the inversion voltage output from the first inversion unit according to the switching control signal;
   a second switch unit selecting and passing any one of the driving voltage output from the second phase conversion unit and the inversion voltage output from the second inversion unit according to the switching control signal; and
   a third switch unit selecting and passing any one of the driving voltage output from the third phase conversion unit and the inversion voltage output from the third inversion unit according to the switching control signal.

8. The apparatus as set forth in claim 7, wherein the driving module includes:
   a first driving unit supplying the driving voltage of the driving axis in the driving voltage passing through the first and third switch units to the corresponding driving electrode of the gyroscope sensor in order to drive in driving stop conditions and supplying the inversion voltage passing through the first and third switch unit to the corresponding driving electrode of the gyroscope sensor in order to stop driving in driving conditions; and
   a second driving unit supplying the driving voltage of the driving axis in the driving voltage passing through the second and third switch units to the corresponding driving electrode of the gyroscope sensor in order to drive in driving stop conditions and supplying the inversion voltage passing through the second and third switch unit to the corresponding driving electrode of the gyroscope sensor in order to stop driving in driving conditions.

9. The apparatus as set forth in claim 8, wherein the first driving unit includes:
   a first driving adder passing or adding and outputting the first-axis driving voltage or the first-axis inversion voltage passing through the first-axis switch unit and the third-axis driving voltage or the third-axis inversion voltage passing through the third-axis switch unit, respectively;
   a first driving subtractor passing the third-axis driving voltage or the third-axis inversion voltage signal passing through the third-axis switch unit, inverting and outputting the first-axis driving voltage or the first-axis inversion voltage passing through the first-axis switch unit, or outputting a signal subtracting the first-axis driving voltage or the first-axis inversion voltage passing through the first-axis switch unit from the third-axis driving voltage or the third-axis inversion voltage passing through the third-axis switch unit; and
   a first driving amplifier amplifying the voltage output from the first driving adder and applying the amplified voltage to the positive driving electrode disposed on the first axis of the gyroscope sensor and amplifying the voltage output from the first driving subtractor and applying the amplified voltage to the negative driving electrode disposed on the first axis of the gyroscope sensor.

10. The apparatus as set forth in claim 8, wherein the second driving unit includes:
   a second driving adder passing or adding and outputting the second-axis driving voltage or the second-axis inversion voltage passing through the second-axis switch unit and the third-axis driving voltage or the third-axis inversion voltage passing through the third-axis switch unit, respectively;
   a second driving subtractor passing the third-axis driving voltage or the third-axis inversion voltage signal passing through the third-axis switch unit, inverting and outputting the second-axis driving voltage or the second-axis inversion voltage passing through the second-axis switch unit, or outputting a signal subtracting the second-axis driving voltage or the second-axis inversion voltage passing through the second-axis switch unit from the third-axis driving voltage or the third-axis inversion voltage passing through the third-axis switch unit; and
   a second driving amplifier amplifying the voltage output from the second driving adder and applying the amplified voltage to the positive driving electrode disposed on the second axis of the gyroscope sensor and amplifying the voltage output from the second driving subtractor and applying the amplified voltage to the negative driving electrode disposed on the second axis of the gyroscope sensor.

* * * * *